(12) United States Patent
Cheng et al.

(10) Patent No.: US 11,003,033 B2
(45) Date of Patent: May 11, 2021

(54) METHOD FOR MANUFACTURING A DISPLAY PANEL AND A DISPLAY PANEL

(71) Applicant: AU Optronics (Kunshan) Co., Ltd., Kunshan (CN)

(72) Inventors: Chao-Yun Cheng, Hsin-Chu (TW); Shan-Fang Chen, Hsin-Chu (TW); Haiyan Liu, Kunshan (CN)

(73) Assignee: AU OPTRONICS (KUNSHAN) CO., LTD., Kunshan (CN)

( * ) Notice: Subject to any disclaimer, the term of this patent is extended or adjusted under 35 U.S.C. 154(b) by 0 days.

(21) Appl. No.: 16/631,054

(22) PCT Filed: Nov. 7, 2017

(86) PCT No.: PCT/CN2017/109682
§ 371 (c)(1),
(2) Date: Jan. 14, 2020

(87) PCT Pub. No.: WO2019/075798
PCT Pub. Date: Apr. 25, 2019

(65) Prior Publication Data
US 2020/0150500 A1 May 14, 2020

(30) Foreign Application Priority Data
Oct. 20, 2017 (CN) .......................... 201710984889.5

(51) Int. Cl.
*G02F 1/1362* (2006.01)
*G02F 1/13* (2006.01)
(Continued)

(52) U.S. Cl.
CPC ...... *G02F 1/136259* (2013.01); *G02F 1/1309* (2013.01); *G02F 1/13439* (2013.01);
(Continued)

(58) Field of Classification Search
CPC .................................................. G02F 1/136259
See application file for complete search history.

(56) References Cited

U.S. PATENT DOCUMENTS

| | | |
|---|---|---|
| 6,239,856 B1 | 5/2001 | Imura et al. |
| 2006/0047030 A1 | 3/2006 | Yoshida et al. |

(Continued)

FOREIGN PATENT DOCUMENTS

| | | | |
|---|---|---|---|
| CN | 101405354 A | 4/2009 | |
| CN | 102116948 * | 7/2011 | ............... G02F 1/13 |

(Continued)

*Primary Examiner* — Sang V Nguyen
(74) *Attorney, Agent, or Firm* — WPAT, PC (57) ABSTRACT

A method for manufacturing a display panel is disclosed. The method includes: forming a color filter and a transparent conductive film on a surface of a first substrate, the color filter being interposed between the first substrate and the transparent conductive film; forming an electrostatic protective layer on the other surface of the first substrate; forming another transparent conductive film on a second substrate; forming a light-valve molecular layer between the first substrate and the second substrate; performing a defect inspection in the display panel; and irradiating a laser onto the electrostatic protective layer when a defect is found in the display panel, such that a carbonization structure is formed in the electrostatic protective layer at a position corresponding to the defect.

23 Claims, 11 Drawing Sheets

(51) Int. Cl.
  *G02F 1/1335* (2006.01)
  *G02F 1/1343* (2006.01)
  *G02F 1/1333* (2006.01)

(52) U.S. Cl.
  CPC .. *G02F 1/133516* (2013.01); *G02F 1/136204* (2013.01); *G02F 1/13338* (2013.01); *G02F 1/133512* (2013.01)

(56) References Cited

U.S. PATENT DOCUMENTS

| | | | | |
|---|---|---|---|---|
| 2010/0040805 | A1* | 2/2010 | Suh | C09K 3/16 428/1.4 |
| 2011/0228189 | A1* | 9/2011 | Oh | G06F 3/0412 349/43 |
| 2015/0137108 | A1* | 5/2015 | Iwase | B32B 27/308 257/40 |
| 2015/0277623 | A1* | 10/2015 | Nakamura | G06F 3/0446 345/174 |
| 2016/0064672 | A1* | 3/2016 | Lee | H01L 51/442 257/40 |

FOREIGN PATENT DOCUMENTS

| | | | | |
|---|---|---|---|---|
| CN | 102116948 | A | 7/2011 | |
| CN | 102629004 | A | 8/2012 | |
| JP | H11311806 | A | 11/1999 | |
| JP | 2002341788 | A | 11/2002 | |
| JP | 2015121602 | A | 7/2015 | |
| KR | 20060096575 | A | 9/2006 | |
| KR | 10-0835327 | * | 5/2008 | G02F 1/13 |
| TW | 499617 | B | 8/2002 | |
| TW | 200620328 | A | 6/2006 | |

\* cited by examiner

METHOD FOR MANUFACTURING A DISPLAY PANEL AND A DISPLAY PANEL

CROSS-REFERENCE TO RELATED APPLICATIONS

This non-provisional application claims priority under 35 U.S.C. § 119(a) on Patent Application No. 201710984889.5 filed in P.R. China on Oct. 20, 2017, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The present invention relates to a method for manufacturing a display panel and a display panel.

2. Related Art

Displays are common devices in daily life, and are widely applied in a mobile phone and a computer, in particular, a smart phone and a touch computer. A liquid crystal display is a non-self-luminous display, including liquid crystals that are a substance between a crystal and a liquid. When the liquid crystals are activated by an external excitation, such as an electric field, an alignment of liquid crystal molecules may be changed according to the electric field. Different alignments of the liquid crystal molecules may generate different polarization directions of light rays passed through. Based on such characteristics, an optical grating may be generated with a polarizer. Accordingly, a display assembly may be manufactured. Further, the electric field applied to the liquid crystals may be provided by controlling thin film transistors externally, to control brightness and darkness of the liquid crystals.

However, in manufacture of the assembly, in particular, in manufacture the thin film transistors, some unexpected fine particles may remain or settle on the thin film transistors due to poor control of a clean room, instruments and equipments, or process conditions. Those fine particles may cause abnormal short circuits or open circuits depending on designs, resulting in fixed bright spots in pixels corresponding to the thin film transistors having such defects, i.e., so called product defects. Conventionally, it is also referred as a bright spot defect.

With respect to the above defect, a common method for repairing the bright spot is to carbonize a color filter using a laser. However, in practical applications, since the color filter is disposed inside the display panel and contacts with other components, it is easy to damage other internal components, such as a transparent conductive layer which is used for touch sensing, when the color filter is irradiated by the laser. Accordingly, there may be a black halo phenomenon in the display panel, which still affects display functions.

SUMMARY OF THE INVENTION

The present invention provides a method for manufacturing a display panel and a display panel to solve the technical drawbacks of complicated process for repairing bright spots in the prior art.

In order to achieve the above object, the embodiment of the present invention provides a method for manufacturing a display panel, comprising: forming a color filter and a transparent conductive film on a surface of a first substrate, the color filter being interposed between the first substrate and the transparent conductive film; forming an electrostatic protective layer on the other surface of the first substrate; forming another transparent conductive film on a second substrate; forming a light-valve molecular layer between the first substrate and the second substrate; performing a defect inspection in the display panel; and irradiating a laser onto the electrostatic protective layer when a defect is found in the display panel, such that a carbonization structure is formed in the electrostatic protective layer at a position corresponding to the defect.

Moreover, another embodiment of the present invention provides a display panel, comprising: a first substrate; a color filter disposed on a surface of the first substrate; a first transparent conductive film disposed on the surface of the first substrate, the color filter being interposed between the first substrate and the transparent conductive film; an electrostatic protective layer disposed on the other surface of the first substrate; a second substrate; a second transparent conductive film disposed on the second substrate; and a light-valve molecular layer formed between the first substrate and the second substrate. The electrostatic protective layer includes an organic transparent conductive material layer having a thickness ranging from 1000 nm to 2500 nm.

Still another embodiment of the present invention provides another display panel, comprising: a first substrate; a color filter disposed on a surface of the first substrate; a first transparent conductive film disposed on the surface of the first substrate, the color filter being interposed between the first substrate and the first transparent conductive film; an electrostatic protective layer disposed on the other surface of the first substrate and including a carbonization structure; a second substrate; a second transparent conductive film disposed on the second substrate; and a light-valve molecular layer interposed between the first substrate and the second substrate.

DETAILED DESCRIPTION OF THE INVENTION

A method for repairing bright spots in a display panel and a manufacturing method of the present invention integrates a bright-spot repairing layer into an electrostatic protective layer in the display panel, so as to repair bright spots simply by carbonizing the electronic protective layer, no matter whether the bright spots occurs in manufacture of or in use of the display panel.

Figure 1:
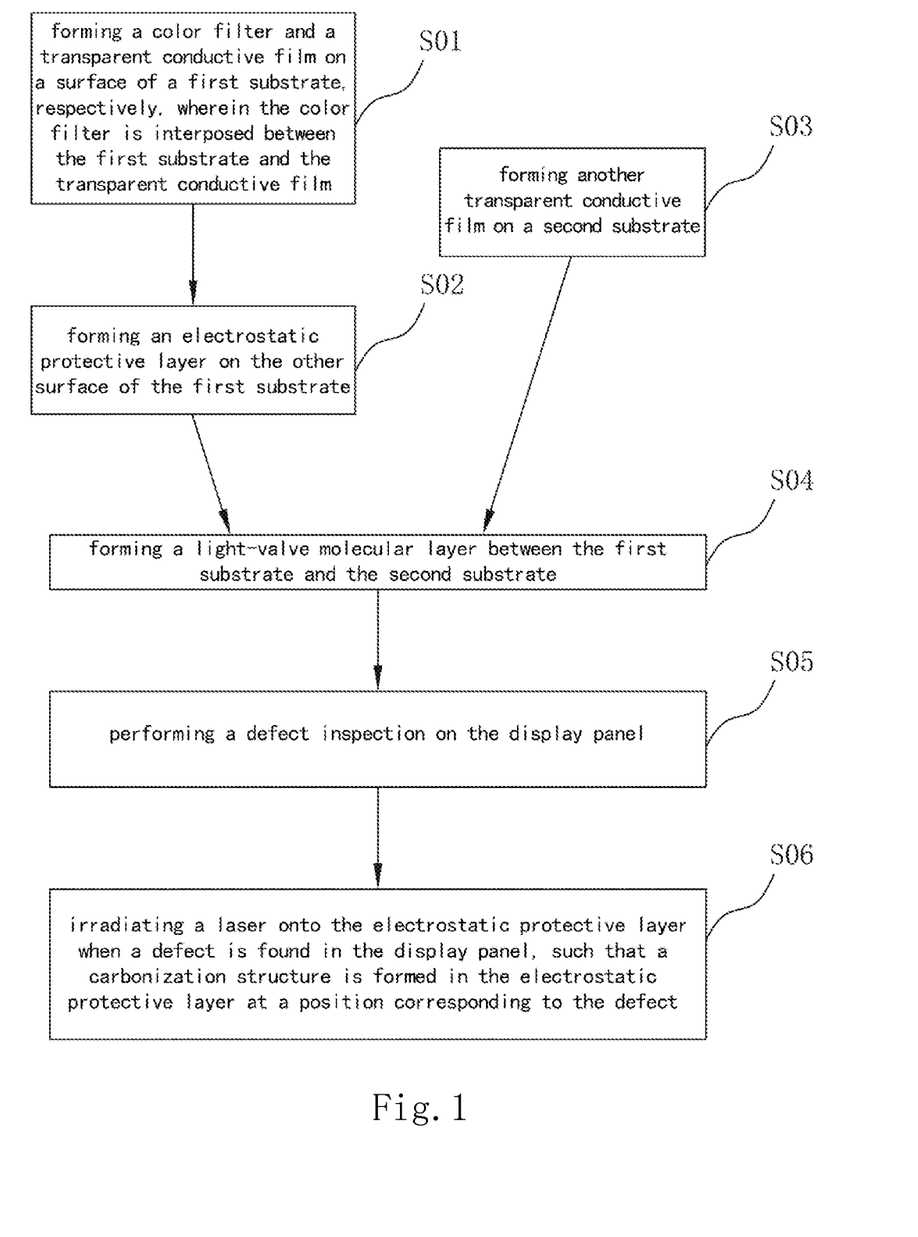
FIG. 1 is a flow chart showing a method for manufacturing a display panel according to an embodiment of the present invention.

FIG. 1 is a flow chart showing a method for manufacturing a display panel according to an embodiment of the present invention. As shown in FIG. 1, the method for manufacturing a display panel according to the embodiment of the present invention comprises:

Step S01: forming a color filter and a transparent conductive film on a surface of a first substrate, the color filter being interposed between the first substrate and the transparent conductive film;

Step S02: forming an electrostatic protective layer on the other surface of the first substrate;

Step S03: forming another transparent conductive film on a second substrate;

Step S04: forming a light-valve molecular layer between the first substrate and the second substrate;

Step S05: performing a defect inspection on the display panel; and

Step S06: irradiating a laser onto the electrostatic protective layer when a defect is found in the display panel, such that a carbonization structure is formed in the electrostatic protective layer at a position corresponding to the defect.

In the embodiment of the present invention, the electrostatic protective layer in Step S02 is formed from an organic transparent conductive material, such as polyethylene thiophene (PEDOT) or derivatives with the polyethylene thiophene as a polymer matrix. Further, the electrostatic protective layer has a thickness ranging from 1000 nm to 2500 nm, such that the electrostatic protective layer implements both functions of releasing static electricity and repairing bright spot defects.

Figure 2A:
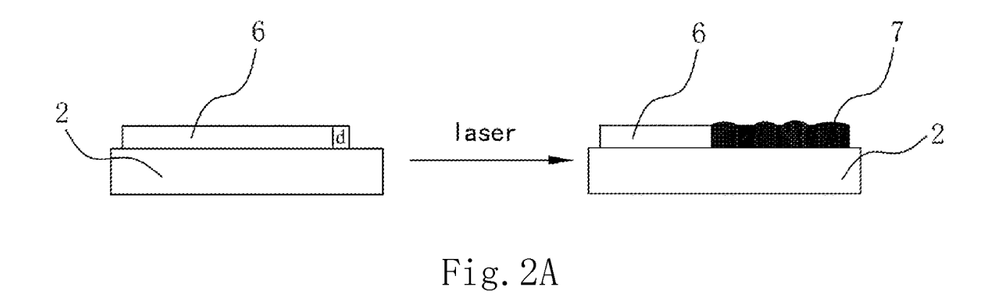
FIGS. 2A and 2B are schematic diagrams showing influence of the thicknesses of the electrostatic protective layer imposed on the carbonization results according to the embodiment of the present invention.
Figure 2B:
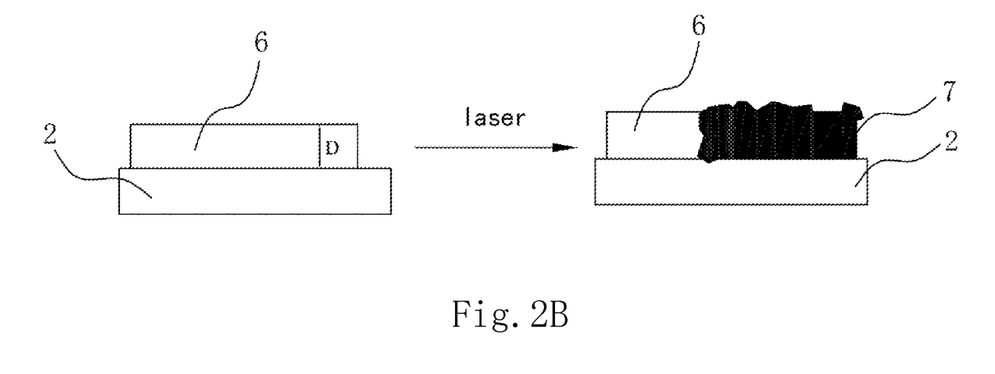

In the embodiment of the present invention, the electrostatic protective layer has a thickness ranging from 1000 nm to 2500 nm, and preferably, from 1500 nm to 2000 nm. When the thickness of the electrostatic protective layer is greater than 2500 nm, the carbonization structure obtained through the laser carbonization process has protrusions on the surface, resulting in appearance defects. In this embodiment, the carbonization principle is to carbonize the electrostatic protective layer of an organic transparent conductive material at a high temperature. Specifically, at a high temperature, an organic layer is gradually carbonized by gradually losing elements of H, O, etc. If the elements of H and O loss excessively at the high temperature, the organic layer would lose its original structure, resulting in a micro-explosion. The greater the thickness is, the more serious the deformation will be. Referring to FIGS. 2A and 2B, FIGS. 2A and 2B are schematic diagrams showing influence of the thicknesses of the electrostatic protective layer imposed on the carbonization results according to the embodiment of the present invention. To facilitate description, FIGS. 2A and 2B only illustrates that the electrostatic protective layer 6 is disposed on the first substrate 2, and omits other layers. As shown in FIGS. 2A and 2B, a thickness d of the electrostatic protective layer 6 in FIG. 2A is in a range from 1000 nm to 2500 nm. After the laser irradiation, a carbonization structure 7 is formed in the electrostatic protective layer 6. Protrusions are slightly formed on the surface of the carbonization structure 7, which does not affect the appearance and display quality of the display panel. On the other hand, a thickness D of the electrostatic protective layer 6 in FIG. 2B is greater than 2500 nm. After the laser irradiation, obvious protrusions are observed on the surface of the carbonization structure 7, resulting in obvious defects in appearance which greatly affect the display quality. Therefore, in the embodiment of the present invention, when the electrostatic protective layer 6 has a thickness less than 2500 nm, the above deformation defects are effectively inhibited. Meanwhile, when the electrostatic protective layer 6 has a thickness greater than 1000 nm, the bright spots are perfectly shielded in a full carbonization state.

In the embodiment of the present invention, PEDOT is used as the material of the organic layer to be repaired by the laser, and possesses excellent optical performances, such as a light transmittance greater than 90%. Further, as an organic conductive material, PEDOT has a resistance that is preferably controlled within a range from $10^7\Omega$ and $10^9\Omega$, so as to facilitate electrostatic protection, i.e., releasing charges and satisfying requirements for releasing charges in the display panel, and also to effectively improve sensitivity of a touch function in the display panel.

Figure 3:
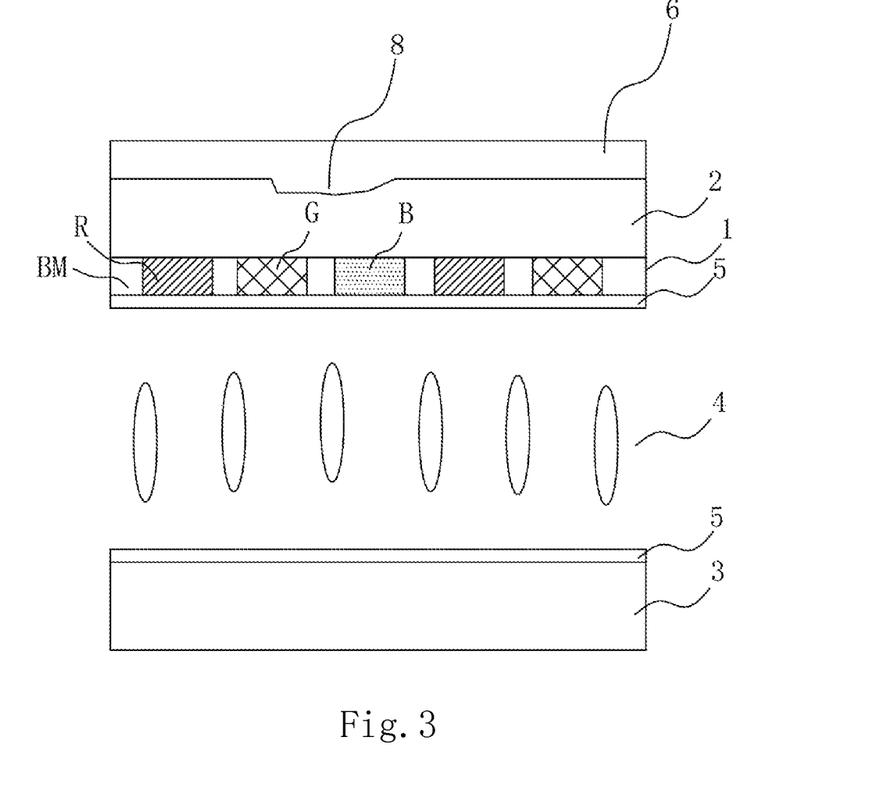
FIG. 3 is a schematic diagram showing a structure of a display panel according to an embodiment of the present invention.

Referring to FIG. 1 again, in Step S02 in the embodiment of the present invention, the electrostatic protective layer is formed by coating an organic transparent conductive material layer (such as, PEDOT) on the first substrate in a wet film state. Specifically, first, the first substrate is cleaned. Then, the organic transparent conductive material layer is coated on the first substrate in a wet film state. Finally, the organic transparent conductive material layer is baked and dried to form a film. In addition, when the film is formed on a surface of the first substrate by using the coating process, the organic transparent conductive material layer is filled into appearance pits 8 in the first substrate, due to a high flowability in the wet film state. As illustrated in FIG. 3, appearance pits 8 are provided in a surface of the first substrate 2. The appearance pits 8 are filled by coating the electrostatic protective layer 6 in the wet film state. Accordingly, the appearance pits 8 in the first substrate 2 are filled, thereby improving the display quality.

Referring to FIG. 1 again, in Step S02 in the embodiment of the present invention, the electrostatic protective layer is formed on an entire surface of the first substrate to release static electricity. Meanwhile, when the bright spots occur, the bright spots are darken through the carbonization structure in the electrostatic protective layer, no matter where the bright spots occur in the display panel. Therefore, the electrostatic protective layer also implements the function of repairing bright spots, without adding a process of forming an additional bright-spot repairing layer in the original process. In addition to the function of repairing bright spots, the electrostatic protective layer of the present invention fills the pits in the surface of the substrate, thereby improving the display quality and the appearance. In another embodiment, an electrostatic protective layer on the entire surface facilitates the touch sensing. Specifically, for example, when a finger of a user or a touch pen touches the electrostatic protective layer, a capacitance value between the electrostatic protective layer and other metal layers will vary, thereby implementing a touch sensing.

Figure 4:
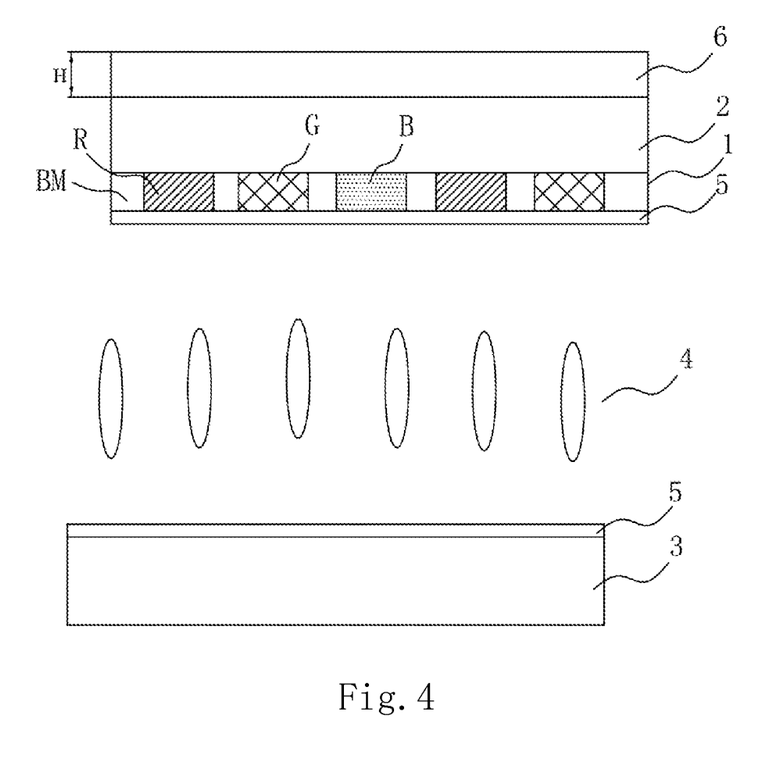
FIG. 4 is a schematic diagram showing a structure of a display panel according to an embodiment of the present invention.

FIG. 4 is a schematic diagram showing a structure of a display panel according to an embodiment of the present invention. As shown in FIG. 4, the display panel according to the embodiment of the present invention comprises a first substrate 2, a color filter 1, a first transparent conductive film 5, an electrostatic protective layer 6, a second substrate 3, a second transparent conductive film 5, and a light-valve molecular layer 4. The color filter 1 and the first transparent conductive film 5 are disposed on the same surface of the first substrate 2. The color filter 1 is interposed between the first substrate 2 and the first transparent conductive film 5. The electrostatic protective layer 6 is disposed on the other surface of the first substrate 2, such that the first transparent conductive film 5 and the electrostatic protective layer 6 are disposed on opposite surfaces of the first substrate 2. Further, the second transparent conductive film 5 is disposed on the second substrate 3. The light-valve molecular layer 4 is interposed between the first substrate 2 and the second substrate 3. Specifically, the display panel further comprises thin film transistors (not shown) which are disposed on the second substrate 3. Those skilled in the art may well understand the operation principle of the display panel, and thus detailed description is omitted.

In the embodiment of the present invention, the electrostatic protective layer 6 includes an organic transparent conductive material layer. When the electrostatic protective layer 6 is formed from organic materials, oxygen and hydrogen in the organic materials is carbonized through laser irradiation. Accordingly, the defects are shielded and repaired through a carbonization structure. Further, the organic transparent conductive material layer has a thickness ranging from 1000 nm to 2500 nm, and preferably from 1500 nm to 2000 nm. When the thickness is less than 1000 nm, and the carbonization process is performed over the entire thickness of 1000 nm (i.e., a full carbonization), the defects can't be shielded sufficiently, resulting in a display panel that is still a poor product. When the thickness is greater than 2500 nm, the surface of the carbonization structure becomes a concave-convex surface easily, which affects the display quality and the appearance. Therefore, in this embodiment, when the organic transparent conductive material layer has a thickness ranging from 1000 nm to 2500 nm, it forms a carbonization structure which shields the defects and also ensure good display quality and good appearance. Further, in this embodiment, the organic transparent conductive material layer has a resistance ranging from $10^7\Omega$ to $10^9\Omega$, which facilitate the electrostatic protection, i.e. releasing charges and satisfying requirements for releasing charges in the display panel, and also to effectively improve sensitivity of a touch function in the display panel.

Figure 5:
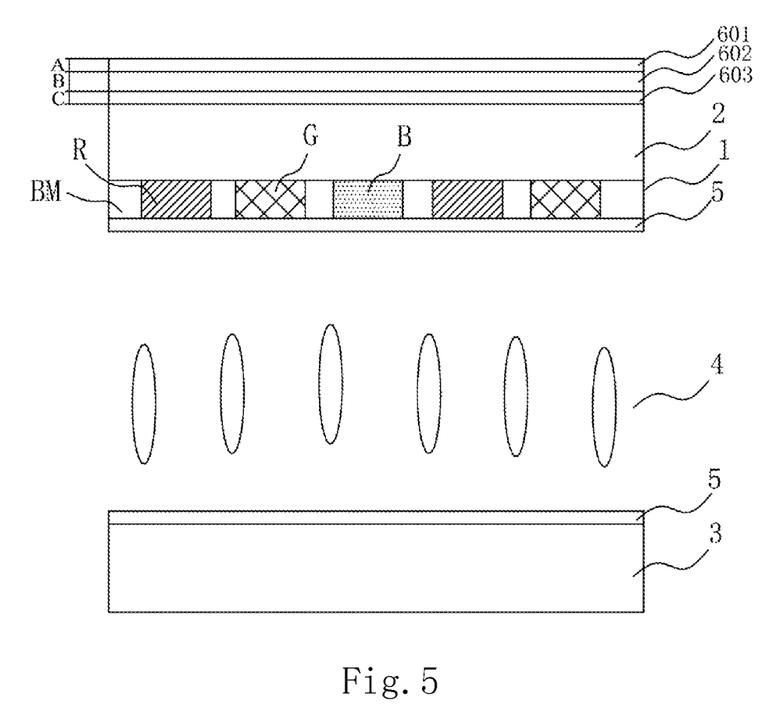
FIG. 5 is a schematic diagram showing a structure of a display panel according to another embodiment of the present invention.

FIG. 5 is a schematic diagram showing a structure of a display panel according to another embodiment of the present invention. This embodiment in FIG. 5 differs from the embodiment in FIG. 4 in that the electrostatic protective layer in FIG. 5 includes a surface layer 601, an intermediate layer 602 and a bottom layer 603. The intermediate layer 602 is formed from an organic transparent conductive material. In this embodiment, the intermediate layer 602 is used for laser carbonization. Therefore, the intermediate layer 602 is an organic transparent conductive material layer having a light transmittance greater than 90%. For example, the organic transparent conductive material may be polyethylene thiophene or derivatives with the polyethylene thiophene as a polymer matrix.

In the embodiment shown in FIG. 5, the surface layer 601 is used as a protective layer for preventing the intermediate layer 602 from peeling off due to the carbonization. In details, the surface layer 601 is a transparent conductive material layer having a light transmittance greater than 90%, and is preferably capable of releasing static electricity. Further, the bottom layer 603 is mainly used for enhancing adhesiveness to the substrate. For example, the bottom layer 603 has a good flowability in the wet film state, which facilitates to improve the adhesiveness. In details, the bottom layer 603 is formed from an organic material. In this embodiment, when the intermediate layer 602 is formed from PEDOT, the surface layer 601 is also formed from PEDOT. When the surface layer 601 and the intermediate layer 602 are formed from the same material (PEDOT), good adhesiveness of the PEDOT material effectively prevents peeling-off of the intermediate layer 602 caused by carbonization. Additionally, excellent electrical conductivity of the PEDOT material implements the function of releasing static electricity. Further, the bottom layer 603 is formed from a material that is transparent and has a high flowability, such as PEDOT or the like. PEDOT has a good flowability in a liquid state, and thus fills the pits in the first substrate 2. Additionally, PEDOT has a good adhesiveness to glass which is a material of the first substrate 2. In this embodiment, the surface layer 601 is used as a protection layer; the bottom layer 603 is used to enhance adhesiveness to the first substrate 2; and the intermediate layer 602 is mainly used as an organic material layer for laser repairing. The materials of the surface layer 601, the bottom layer 603 and the intermediate layer 602 are not limited to those enumerated above, as long as they implement the same functions mentioned above. For example, in order to allow the electrostatic protective layer to implement functions of releasing static electricity and assisting in touch sensing, the surface layer 601 is formed from a transparent conductive material with a specific resistance, and the intermediate layer 602 is formed as an organic material layer. In other modifications, the intermediate layer 602 is formed from an organic transparent conductive material, and serves as a carbonization layer for laser repairing and an electrostatic releasing layer.

In the embodiment of the present invention, as shown in FIG. 5, a thickness C of the bottom layer 603 ranges from about 20 nm to 100 nm. The bottom layer 603 enhances the adhesiveness. Therefore, as far as a film is formed stably (with a lower limit value 20 nm), the thinner the bottom layer 603 is formed, the better it will be. A thickness A of the surface layer 601 ranges from 100 nm to 300 nm. The surface layer 601 serves as a protection layer and a static-electricity releasing layer. Taking PEDOT as an example, the material of the surface layer 601 preferably has a resistance ranging from $10^7\Omega$ to $10^9\Omega$, and is formed with a film thickness of about 115 nm. There are different requirements for the film thicknesses of the bottom layer, the intermediate layer and the upper layer in the electrostatic protective layer, depending on different functions of those layers. The thickness C of the bottom layer 603 is less than the thickness A of the surface layer 601. The thickness A of the surface layer 601 is less than a thickness B of the intermediate layer 602. The relationship among the thicknesses of the three layers is C<A<B.

In the embodiment of the present invention, when a defect is found in a display panel, the electrostatic protective layer is carbonized using a laser at a position corresponding to the defect. Referring to Steps S05 and S06 in FIG. 1, for example, contaminants remain in the display panel during manufacture of the display panel. For example, there are dusts and contaminated particles in the color filter layer. When the display panel is inspected in a subsequent process, bright spots which are caused by the dusts and contaminated particles are found in the display panel. At this time, the electrostatic protective layer is irradiated by a laser at regions of those bright spots, so as to form carbonization structures. The dusts and contaminated particles are shielded through the carbonization structures. Therefore, the bright spots are repaired.

Figure 6:
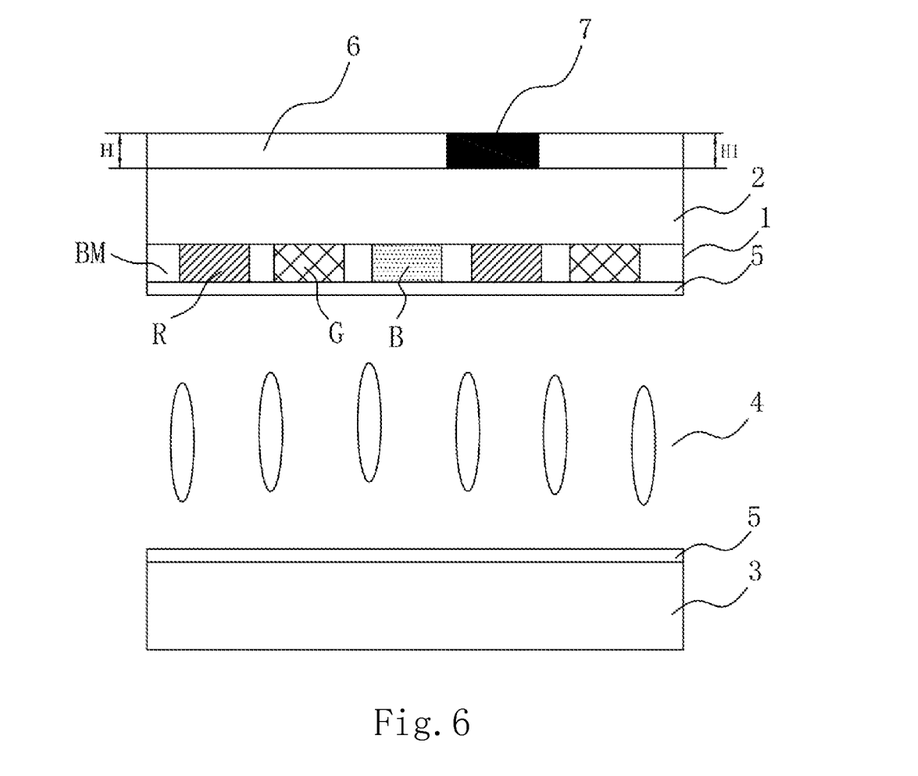
FIG. 6 is a schematic diagram showing a full carbonization in the display panel according to the embodiment of the present invention.

In another embodiment of the present invention, a display panel is provided, in which the electrostatic protective layer is repaired by carbonizing regions of bright spots. FIG. 6 is a schematic diagram showing a full carbonization in the display panel according to the embodiment of the present invention. Like reference numbers and names are assigned to like elements in FIGS. 4 and 6, and repeated description is omitted here. The embodiment in FIG. 6 differs from the embodiment in FIG. 4 in that the electrostatic protective layer 6 in the display panel shown in FIG. 6 includes a carbonization structure 7. In this embodiment, a thickness of the carbonization structure 7 is defined as H1, and a thickness of the electrostatic protective layer 6 is defined as H. The thickness H1 of the carbonization structure 7 is substantially the same as the thickness H of the electrostatic protective layer 6. Since their thicknesses are substantially the same, this carbonization structure is referred as a full carbonization.

Figure 7:
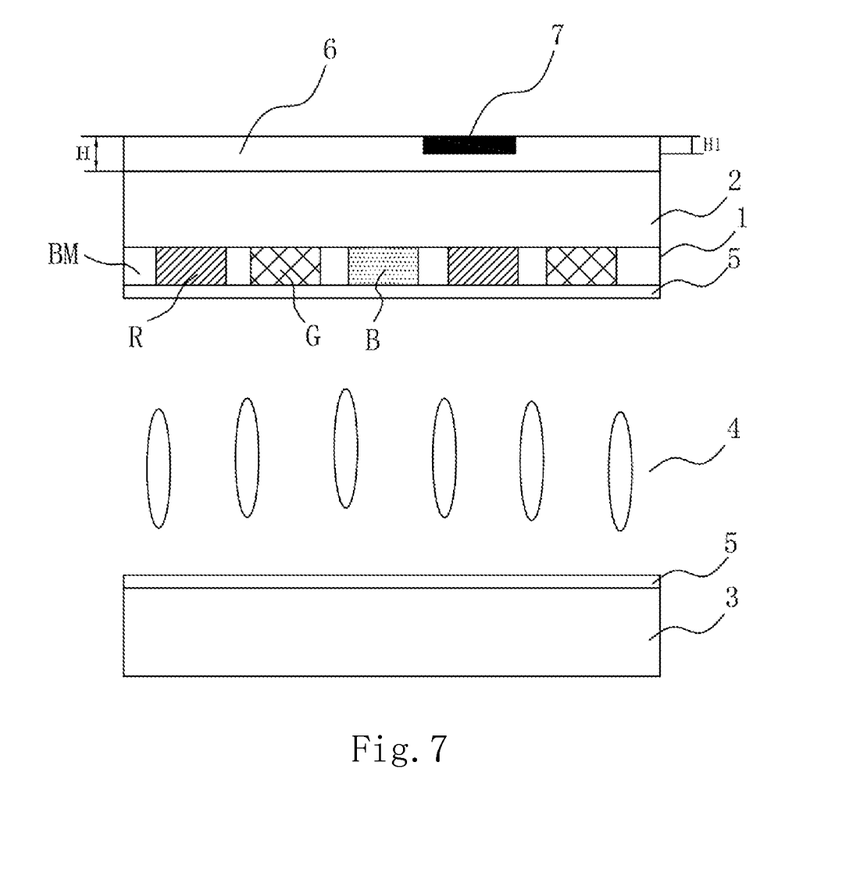
FIG. 7 is a schematic diagram showing a partial carbonization in the display panel according to another embodiment of the present invention.

Another embodiment is shown in FIG. 7. FIG. 7 is a schematic diagram showing a partial carbonization in the display panel. In this embodiment, the thickness of the carbonization structure 7 is defined as H1, and the thickness of the electrostatic protective layer 6 is defined as H. The thickness H1 of the carbonization structure 7 is smaller than the thickness H of the electrostatic protective layer 6. In other words, part of the electrostatic protective layer 6 in depth (e.g., with the thickness H1) becomes a carbonization structure through the laser irradiation, while the rest in depth (e.g., with the thickness H by subtracting the thickness H1) preserves the characteristics of the materials of the electrostatic protective layer. Accordingly, this carbonization structure is referred as a partial carbonization. In this embodiment, the organic layer is partially carbonized by controlling power of the laser during the laser repairing process. The partial carbonization prevents the carbonization structure from directly contacting with the first substrate 2, so as to reduce the possibility of peeling-off of the carbonization structure 7 from the first substrate 2. Meanwhile, during the laser repairing process, a local halo phenomenon, which is generally caused by reflected laser from the first substrate 2 (e.g., of a glass material), is inhibited. Accordingly, the shape or the area of the laser is easily controlled. In this embodiment, the electrostatic protective layer 6 is formed from an organic conductive transparent material. For example, such a material is PEDOT. Further, due to the stable characteristics of the material in film forming, the thickness of the electrostatic protective layer 6 minus the carbonized depth of the electrostatic protective layer 6 is equal to or greater than 20 nm. That is, a minimum value of thickness H–H1 is 20 nm.

Figure 8:
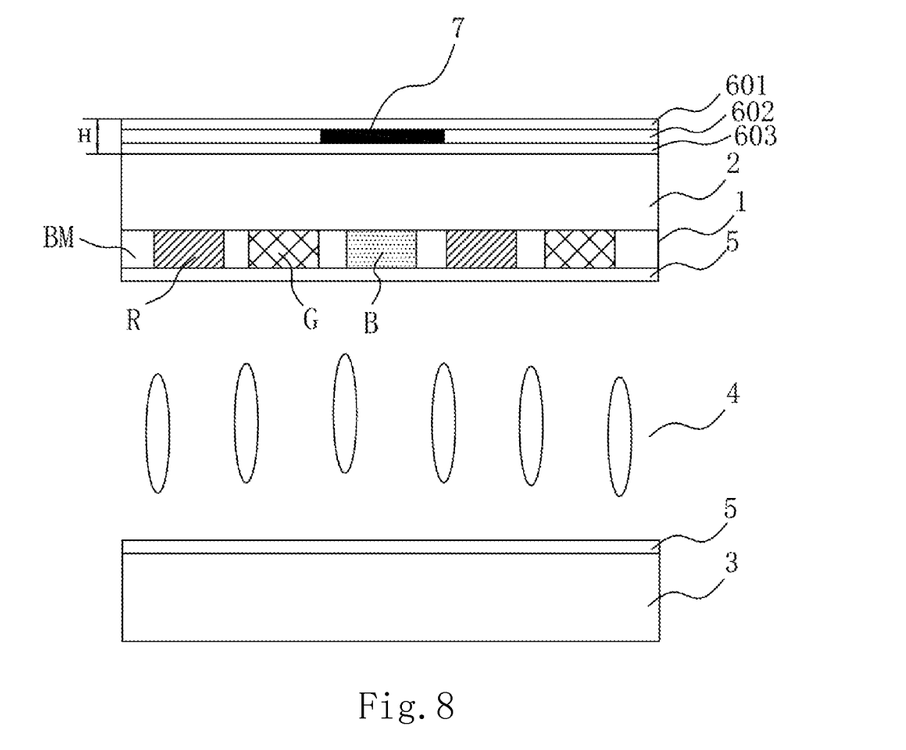
FIG. 8 shows a schematic diagram in which the intermediate layer in the display panel is carbonized according to an embodiment of the present invention.
Figure 9:
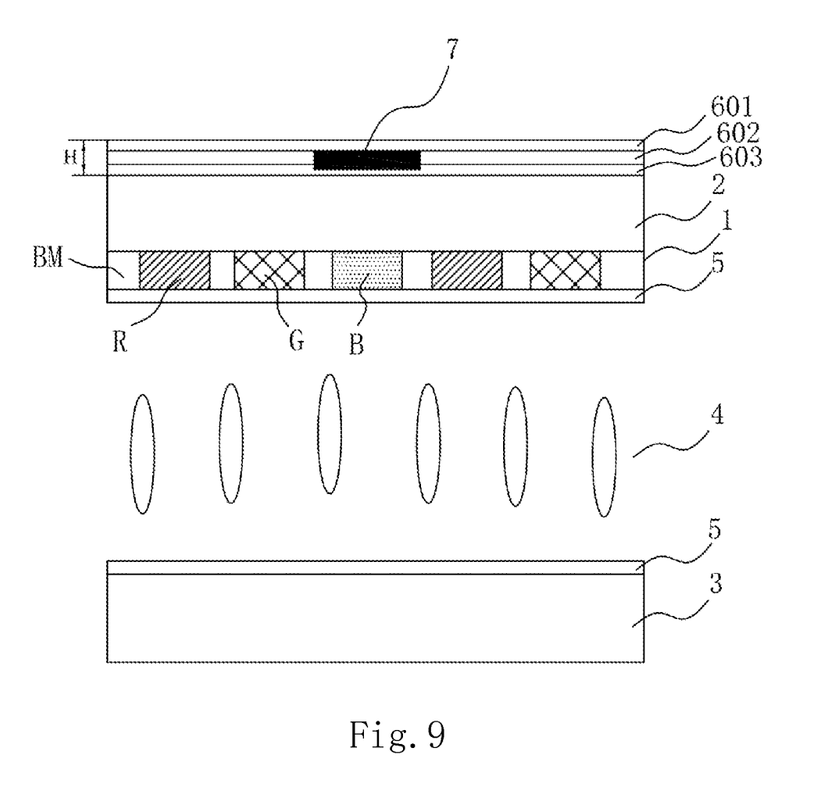
FIG. 9 shows a schematic diagram in which the intermediate layer and a part of the bottom layer in the display panel are carbonized according to an embodiment of the present invention.
Figure 10:
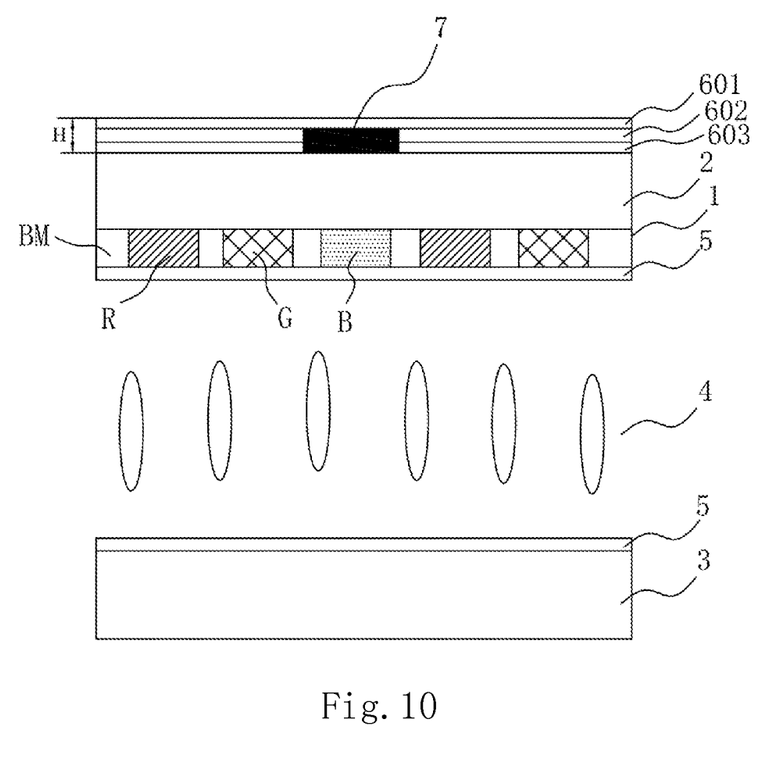
FIG. 10 shows a schematic diagram in which the intermediate layer and the entire bottom layer in the display panel are carbonized according to an embodiment of the present invention.

Proceeding to FIGS. 8, 9 and 10, FIGS. 8, 9 and 10 shows modifications of the display panel in FIG. 5. Like reference numbers and names are assigned to like elements in FIGS. 8, 9, 10, and 5, and repeated description is omitted here. FIG. 8 shows a schematic diagram in which the intermediate layer in the display panel is carbonized according to an embodiment of the present invention. FIG. 9 shows a schematic diagram in which the intermediate layer and a part of the bottom layer in the display panel are carbonized according to an embodiment of the present invention. FIG. 10 shows a schematic diagram in which the intermediate layer and the entire bottom layer in the display panel are carbonized according to an embodiment of the present invention. In the embodiment of FIG. 8, the intermediate layer 602 is formed from an organic material. Accordingly, after laser irradiation, a carbonization structure 7 is formed in the intermediate layer 602. In this embodiment, a bottom layer 603 is disposed between the carbonization structure 7 and the first substrate 2, for enhancing the adhesiveness between the carbonization structure 7 and the first substrate 2, so as to reduce the possibility of peeling-off. Meanwhile, the carbonization structure 7 is further protected by the surface layer 601 to avoid embrittlement and peeling-off of the carbonization structure 7. In the embodiment of FIG. 9, both the intermediate layer 602 and the bottom layer 603 are formed from organic materials. Accordingly, the carbonization structure 7 is formed in the intermediate layer 602 and the bottom layer 603 through specific laser power and irradiation time. In this embodiment, only part of the bottom layer 603 in depth is irradiated by the laser to form the carbonization structure 7. Accordingly, the bottom layer 603 is partially carbonized. With such a design, there is no carbonization structure formed in part of the bottom layer 603 (i.e., a region adjacent to the first substrate 2), which facilitates to enhance the adhesiveness. In the modification in FIG. 10, both the intermediate layer 602 and the bottom layer 603 are fully carbonized (i.e., a full carbonization structure 7). Accordingly, the shielding effects of the carbonization structure 7 are improved. In order to implement both functions of releasing static electricity and assisting in touching, the surface layer 601 and the intermediate layer 602 are formed from conductive transparent materials having a specific resistance, e.g., ranging from $10^7 \Omega$ to $10^9 \Omega$.

Figure 11:
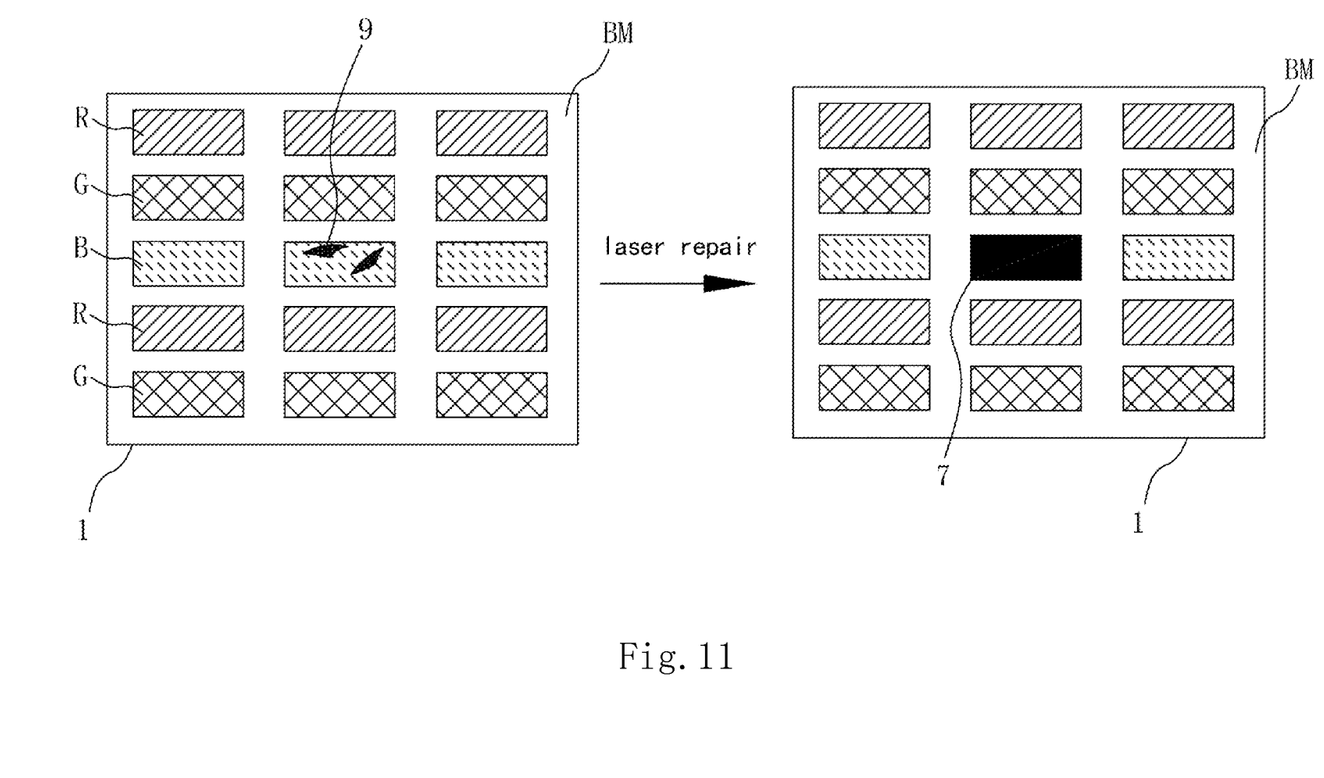
FIG. 11 is a top view of a display panel which is repaired with a laser according to an embodiment of the present invention.

FIG. 11 is a top view of a display panel which is repaired with a laser according to an embodiment of the present invention. To facilitate illustration, FIG. 11 only shows a color filter and a carbonization structure, and omits other layers. Further, the present invention is not limited to the arrangement of respective filter structures R/G/B in FIG. 11, and implements in other arrangements depending on different requirements or designs. In the embodiment of the present invention, the principle of the laser repair process is to focus the laser onto a point to carbonize the electrostatic protective layer. The laser is highly targeted, and the area of the laser is easily controlled, such that the carbonization structure is substantially located within the ranges of respective filter structures R/G/B without affecting adjacent filter structures R/G/B. As a result, the defects are accurately repaired. In the embodiment of FIG. 11, the color filter 1 includes a first filter structure B, a second filter structure R, a third filter structure G and a black structure BM. The black structure BM is a light-shielding structure. The first filter structure B, the second filter structure R and the third filter structure G are separated from each other through the black structure BM. In this embodiment, there are contaminants 9 in the first filter structure B, which causes bright spots in a pixel or a sub-pixel corresponding to the first filter structure B and affects the display quality. After repairing the defects by irradiating the laser, a carbonization structure 7 is formed in the electrostatic protective layer at a corresponding position so as to shield the containments 9. In details, in the embodiment of FIG. 11, the position of the carbonization structure 7 corresponds to the first filter structure B, such that there is an overlapped area between the carbonization structure 7 and the first filter structure B in a direction of vertical projection.

In this embodiment, in order to allow the carbonization structure 7 to shield all the pixels or sub-pixels containing the containments (i.e., a single first filter structure B in FIG. 11), the area of the carbonization structure 7 is equal to or larger than that of the first filter structure B. When the area of the carbonization structure 7 is substantially equal to that of the first filter structure B, the carbonization structure 7 just shields the first filter structure B. When the area of the carbonization structure 7 is larger than that of the first filter structure B, the carbonization structure 7 shields the first filter structure B and a black structure BM adjacent to the first filter structure B. In such a case, the area of the carbonization structure 7 is smaller than a sum of the area of the first filter structure B and the area of the black structure BM adjacent thereto. In addition, the laser is highly targeted, and is easily controlled in area. Accordingly, when executing a laser repair process, color filter structures in other regions can't be affected. In other words, as shown in the embodiment of FIG. 11, a minimum unit of the carbonized region is one pixel or one sub-pixel. The pixels/sub-pixels adjacent to the carbonized pixel/sub-pixel don't change in shape. To facilitate description, FIG. 11 only shows an example in which the containments 9 exist in the first filter structure B, but the present invention is not limited thereto.

In another embodiment, when there are contaminants in both the first filter structure B and the second filter structure R, the carbonization structure 7 is formed corresponding to the first filter structure B and the second filter structure R, so that the carbonization structure 7 implements functions of shielding and repairing. In order to allow the carbonization structure 7 to shield all the pixels/sub-pixels containing the contaminants (such as, the first filter structure B and the second filter structure R in this embodiment), the area of the carbonization structure 7 is equal to a sum of the area of the first filter structure B and the area of the second filter structure R. Further, when the region irradiated by the laser is set to be slightly larger, the area of the carbonization structure 7 is larger than the sum of the area of the first filter structure B and the area of the second filter structure R, such that the carbonization structure 7 do not only fully shield the first filter structure B and the second filter structure R, but also cover a part of the black structure BM. In this embodiment, when executing the laser repair process, since the black structure BM is arranged between respective filter structures R/G/B, the area of the laser falls within the range of the black structure BM even if the area of the laser is slightly larger than the range of the filter structure R/G/B. Accordingly, surrounding pixels in normal status do not be affected. A visibility is not be affected either.

In a conventional repairing process in which the bright spots are repaired by irradiating the color filter with the laser, the black halo phenomenon occurs in 26.4% of the display panels. That is, a success rate of the repairing process is 73.6%. On the other hand, in the embodiments of the present invention, the carbonization structure is formed by irradiating the electrostatic protective layer with the laser. In this way, a success rate of the repairing process is raised up to 96% or more. Such data shows the possibility of the embodiments of the present invention obviously, but the present invention is not limited thereto.

In the embodiments of the present invention, the laser repair is performed on the electrostatic protective layer in the display panel, without adding an additional organic layer. Since the electrostatic protective layer is also used as a bright-spot repairing layer, the electrostatic protective layer integrates both functions of releasing static electricity and repairing. In other embodiments, the electrostatic protective layer also assists in touch sensing. When bright spots occurs, the bright spots can be darken simply through a carbonization structure without forming an additional shielding layer, which largely simplifies complexity of the manufacturing process, avoids product defects due to redundant processes, and reduces a thickness of the products. In addition, the electrostatic protective layer is disposed outside the substrate, which also reduces influences of the laser imposed on other components in the display panel, and improves the yield greatly.

Of course, the present invention is also be implemented in other embodiments. Those skilled in the art can make various modifications and variations to the present invention without departing from the spirit and substance of the present invention. However, those modifications and variations shall all belong to the extent of protection defined in the attached claims of the present application.

What is claimed is:

1. A method for manufacturing a display panel, comprising:
   forming a color filter and a transparent conductive film on a surface of a first substrate, the color filter being interposed between the first substrate and the transparent conductive film;
   forming an electrostatic protective layer on the other surface of the first substrate;
   forming another transparent conductive film on a second substrate;
   forming a light-valve molecular layer between the first substrate and the second substrate; and
   performing a defect inspection in the display panel; and
   irradiating a laser onto the electrostatic protective layer when a defect is found in the display panel, such that a carbonization structure is formed in the electrostatic protective layer at a position corresponding to the defect; and a thickness of the carbonization structure is smaller than a thickness of the electrostatic protective layer.

2. The method for manufacturing a display panel according to claim 1, wherein, in the step of forming the electrostatic protective layer, the electrostatic protective layer includes an organic transparent conductive material layer.

3. The method for manufacturing a display panel according to claim 2, wherein in the step of forming the electrostatic protective layer, the organic transparent conductive material layer is coated on the first substrate in a wet film state.

4. The method for manufacturing a display panel according to claim 2, wherein the organic transparent conductive material layer has a thickness ranging from 1000 nm to 2500 nm.

5. The method for manufacturing a display panel according to claim 2, wherein the organic transparent conductive material layer has a resistance ranging from $10^7 \Omega$ to $10^9 \Omega$.

6. The method for manufacturing a display panel according to claim 2, wherein the organic transparent conductive material layer is formed from polyethylene thiophene or derivatives with the polyethylene thiophene as a polymer matrix.

7. A display panel, comprising:
a first substrate;
a color filter disposed on a surface of the first substrate;
a first transparent conductive film disposed on the surface of the first substrate, the color filter being interposed between the first substrate and the transparent conductive film;
an electrostatic protective layer disposed on the other surface of the first substrate; and a carbonization structure having a thickness smaller than a thickness of the electrostatic protective layer; wherein the electrostatic protective layer includes an organic transparent conductive material layer having a thickness ranging from 1000 nm to 2500 nm;
a second substrate;
a second transparent conductive film disposed on the second substrate; and
a light-valve molecular layer formed between the first substrate and the second substrate.

8. The display panel according to claim 7, wherein the organic transparent conductive material layer has a resistance ranging from $10^7\Omega$ to $10^9\Omega$.

9. The display panel according to claim 7, wherein the organic transparent conductive material layer is formed from polyethylene thiophene or derivatives with the polyethylene thiophene as a polymer matrix.

10. The display panel according to claim 7, wherein the electrostatic protective layer includes a surface layer, an intermediate layer and a bottom layer, and
the intermediate layer is the organic transparent conductive material layer.

11. The display panel according to claim 10, wherein the intermediate layer has a light transmittance greater than 90%.

12. The display panel according to claim 10, wherein the surface layer and the bottom layer are formed from the same transparent conductive material.

13. The display panel according to claim 10, wherein a thickness of the bottom layer is less than a thickness of the surface layer, and the thickness of the surface layer is less than a thickness of the intermediate layer.

14. A display panel, comprising:
a first substrate;
a color filter disposed on a surface of the first substrate;
a first transparent conductive film disposed on the surface of the first substrate, the color filter being interposed between the first substrate and the first transparent conductive film;
an electrostatic protective layer disposed on the other surface of the first substrate and including a carbonization structure; and a thickness of the carbonization structure is smaller than a thickness of the electrostatic protective layer; a second substrate;
a second transparent conductive film disposed on the second substrate; and
a light-valve molecular layer interposed between the first substrate and the second substrate.

15. The display panel according to claim 14, wherein the electrostatic protective layer includes an organic transparent conductive material layer having a resistance ranging from $10^7\Omega$ to $10^9\Omega$.

16. The display panel according to claim 15, wherein the organic transparent conductive material layer is formed from polyethylene thiophene or derivatives with the polyethylene thiophene as a polymer matrix.

17. The display panel according to claim 14, wherein an area of the carbonization structure is smaller than an area of the electrostatic protective layer.

18. The display panel according to claim 14, wherein the electrostatic protective layer includes a surface layer, an intermediate layer and a bottom layer, and
the intermediate layer is form from an organic transparent conductive material.

19. The display panel according to claim 18, wherein the carbonization structure is formed in the intermediate layer.

20. The display panel according to claim 14, wherein the color filter includes a first filter structure, a second filter structure, a third filter structure, and a black filter structure,
the black structure is located on between the first filter structure and the second filter structure, and
the carbonization structure is located corresponding to the first filter structure.

21. The display panel according to claim 20, wherein an area of the carbonization structure is equal to or larger than an area of the first filter structure, and
the area of the carbonization structure is smaller than a sum of the area of the first filter structure and an area of the black structure adjacent to the first filter structure.

22. The display panel according to claim 20, wherein the carbonization structure is located corresponding to the first filter structure and the second filter structure, and
an area of the carbonization structure is equal to or larger than a sum of an area of the first filter structure and an area of the second filter structure.

23. The display panel according to claim 22, wherein the area of the carbonization structure is smaller than a sum of the area of the first filter structure, the second filter structure and a sum of an area of the black structure adjacent to the first filter structure and another black structure adjacent to the second filter structure.

* * * * *